(12) United States Patent
Wilcox et al.

(10) Patent No.: US 8,800,197 B2
(45) Date of Patent: Aug. 12, 2014

(54) BLIND MOUNT PIVOTING FISHING ROD HOLDER WITH ADJUSTABLE BRAKE

(75) Inventors: Roger S. Wilcox, Fort Lauderdale, FL (US); Scott A. Wilcox, Plantation, FL (US)

(73) Assignee: Tigress Trading Co., Inc., Dania Beach, FL (US)

( * ) Notice: Subject to any disclaimer, the term of this patent is extended or adjusted under 35 U.S.C. 154(b) by 127 days.

(21) Appl. No.: 13/239,619

(22) Filed: Oct. 28, 2011

(65) Prior Publication Data

US 2012/0055068 A1 Mar. 8, 2012

Related U.S. Application Data

(63) Continuation-in-part of application No. 12/102,279, filed on Apr. 14, 2008, now Pat. No. 8,291,636.

(60) Provisional application No. 60/911,599, filed on Apr. 13, 2007.

(51) Int. Cl.
*A01K 97/10* (2006.01)

(52) U.S. Cl.
USPC .............................. 43/21.2; 114/364; 248/534

(58) Field of Classification Search
USPC ............ 43/21.2; 114/255, 364; 248/511, 519, 248/520, 534, 538, 523
See application file for complete search history.

(56) References Cited

U.S. PATENT DOCUMENTS

| | | | |
|---|---|---|---|
| 3,052,065 A | 9/1962 | Rettman | |
| 3,246,865 A | 4/1966 | Latimer | |
| 4,682,438 A * | 7/1987 | Arrow | 43/21.2 |
| 4,836,127 A | 6/1989 | Wille | |
| 5,054,229 A | 10/1991 | Hughes | |
| 5,054,738 A | 10/1991 | Harding | |
| 5,065,540 A | 11/1991 | Potter, Jr. | |
| 5,163,244 A | 11/1992 | Rupp | |
| 5,301,451 A | 4/1994 | Van Assche | |
| 5,321,904 A | 6/1994 | Benson | |
| 5,322,254 A | 6/1994 | Birkmeier | |
| D348,504 S | 7/1994 | Dahmen | |
| 5,813,162 A | 9/1998 | Tse et al. | |
| D407,137 S | 3/1999 | Thompson | |
| 6,088,946 A | 7/2000 | Simmons | |
| 6,269,584 B1 | 8/2001 | Peaschek | |
| 6,345,722 B1 | 2/2002 | Wingate | |
| D461,521 S | 8/2002 | Krueger | |
| D464,705 S | 10/2002 | Ratliffe | |
| 6,497,067 B1 | 12/2002 | King | |
| D476,716 S | 7/2003 | Wegman | |
| D480,782 S | 10/2003 | DeBerry et al. | |
| D483,436 S | 12/2003 | Tull | |
| 6,672,525 B2 | 1/2004 | Koike et al. | |
| D499,789 S | 12/2004 | Bridgewater | |

(Continued)

*Primary Examiner* — Darren W Ark
*Assistant Examiner* — Kathleen Alker
(74) *Attorney, Agent, or Firm* — GrayRobinson, PA

(57) ABSTRACT

This invention is directed to a fishing rod holder having a generally annular mounting bezel which generally surrounds the mouth of a tube for receiving the butt of a fishing rod. The underside of the mounting bezel includes at least one blind hole or projecting mounting stud for receiving a fastener for mounting the rod holder without penetrating the exposed surface of the mounting bezel, providing an aesthetically pleasing appearance. A rod engaging member or pin engages grooves in the butt of a rod, allowing it to swivel. The amount of resistance of the rod engaging member or pin to swivel motion can be adjusted.

15 Claims, 3 Drawing Sheets

(56) References Cited

U.S. PATENT DOCUMENTS

| | | |
|---|---|---|
| D516,164 S | 2/2006 | Roth et al. |
| 6,993,865 B2 | 2/2006 | Peters et al. |
| 2002/0043014 A1 | 4/2002 | Kondash |
| 2004/0206288 A1 | 10/2004 | Wilcox et al. |
| 2006/0064920 A1 | 3/2006 | Wilcox et al. |

\* cited by examiner

BLIND MOUNT PIVOTING FISHING ROD HOLDER WITH ADJUSTABLE BRAKE

CROSS-REFERENCE TO RELATED APPLICATION

This application is a continuation-in part of, and claims priority under 35 §120 to, U.S. patent application Ser. No. 12/102,279 filed Apr. 14, 2008 now U.S. Pat. No. 8,291,636 which, in turn, claims priority under 35 U.S.C. §119(e) to U.S. Provisional Application Ser. No. 60/911,599, filed Apr. 13, 2007 and entitled "FISHING ROD HOLDER," for all commonly disclosed subject matter. U.S. patent application Ser. No. 12/102,279 and U.S. Provisional Application Ser. No. 60/911,599 are each expressly incorporated herein by reference in their entireties to form a part of the present disclosure.

FIELD OF THE INVENTION

This invention relates to the field of fishing rod holders of the type mountable on marine vessels by way of a mounting bezel which surrounds the mouth of a tube for receiving the butt of a fishing rod. More particularly, the invention relates to a fishing rod holder of such type wherein the mounting bezel is attachable to the vessel by means of fasteners not visible on the upper surface of the bezel after the rod holder has been mounted to the vessel and wherein a member engageable with the butt of the fishing rod is mounted within the tube allowing the rod to swivel under a resistance which may be set or adjusted via an adjustable brake.

BACKGROUND OF THE INVENTION

Fishing rod holders of the type used on marine vessels, such as sport fishing and pleasure boats, generally include a hollow tube in which the butt end of a fishing rod can be inserted to hold a fishing rod in a generally upright, angled or vertical, position for purposes of storage or to hold the rod while fishing. Such fishing rod holders commonly include a mounting bezel surrounding the mouth of the tube. The mounting bezel is typically provided with a plurality of holes for receiving fasteners which can be inserted through the body of the mounting bezel and into an underlying panel of the vessel in order to attach the rod holder to the vessel. Machine screws, bolts or wood screws are generally used and are inserted such that the tops of the heads of the screws remain visible on the exposed upper surface of the mounting bezel after the fishing rod holder has been installed. Because of their visibility on the upper surface of the bezel, the fasteners detract from the appearance of the installation. Irregularities such as driving slots or holes in the heads of the fasteners are also prone to retain dirt and water, a condition which is even more unsightly and promotes corrosion of the fasteners and the mounting bezel itself.

Both tubular fishing rod holders and, more specifically, tubular fishing rod holders in which a transverse bar at the end of the tube engages a slot in the butt of a fishing rod are known in the prior art. This bar can engage either a single transverse groove or pair of transverse grooves at right angles to one another. In U.S. Pat. No. 3,745,690 to Lewis these grooves are cited as enabling, in the case of a rod with a pair of such grooves, the rod to be placed in the holder in four positions. In the case of the '690 patent as well as that of U.S. Pat. No. 3,964,706 to Adams, U.S. Pat. No. 4,375,731 to Budd, and U.S. Pat. No. 4,901,970 to Moss et. al, a transverse bar in the bottom of the tubular rod holder precludes movement of the rod about its longitudinal axis. However, in U.S. Pat. No. 4,682,438 to Arrow, the aforementioned transverse bar is rotatable, allowing the fishing rod to pivot or swivel such that the tip of the rod traverses a path which has an arcuate component in a horizontal plane. In such a rod holder, a transverse bar extends across the diameter of the center of a rotatable mounting ring flanked on either side by washers, allowing the bar to rotate clockwise or counterclockwise when force is applied to the tip of the rod in a given pivotal direction by a running fish. However, lacking in the prior art is a fishing rod holder which enables a user to set, increase or decrease the resistance of the rod holder, and thus, the rod, to such rotation, effectively managing the ability of the rod to swivel in the direction of pull exerted on it.

SUMMARY OF THE INVENTION

The invention relates to a fishing rod holder having a mounting bezel which is preferably attachable to a vessel by means of fasteners which do not penetrate, and are not visible on, the upper surface of the bezel after the rod holder has been mounted to the vessel and which enables a user to set or adjust the resistance of the rod holder, and thus, the rod, to turning around the rod holder in response to being pulled by a fish. In a preferred embodiment, the underside of the mounting bezel includes at least one, and preferably three (3 each), blind holes for receiving a fastener for mounting the fishing rod holder to the vessel in a manner such that the fastener is not visible on the exposed upper surface of the bezel after mounting. In an alternative embodiment, the underside of the mounting bezel includes at least one downward projection, such as a stud, to which a fastener such as a retaining cap or clip can be secured to attach the rod holder to a mounting panel. In both the preferred and alternative embodiments this invention also relates to a fishing rod holder in which the butt of the rod is fixable to a rotatable rod engaging member that serves to allow the rod to swivel in the direction of pull exerted on the fishing line by a running fish so that the tip of the rod may rotate so as to be able to continuously point toward the fish. In accordance with the invention, the rod holder is provided with an adjustable brake which may be set or adjusted to set the resistance to pivoting of the rod. This resistance may be set within a range, or adjusted over a range, which may span anywhere between substantially zero resistance to pivoting to substantially locked against pivoting.

DETAILED DESCRIPTION

Figure 1:
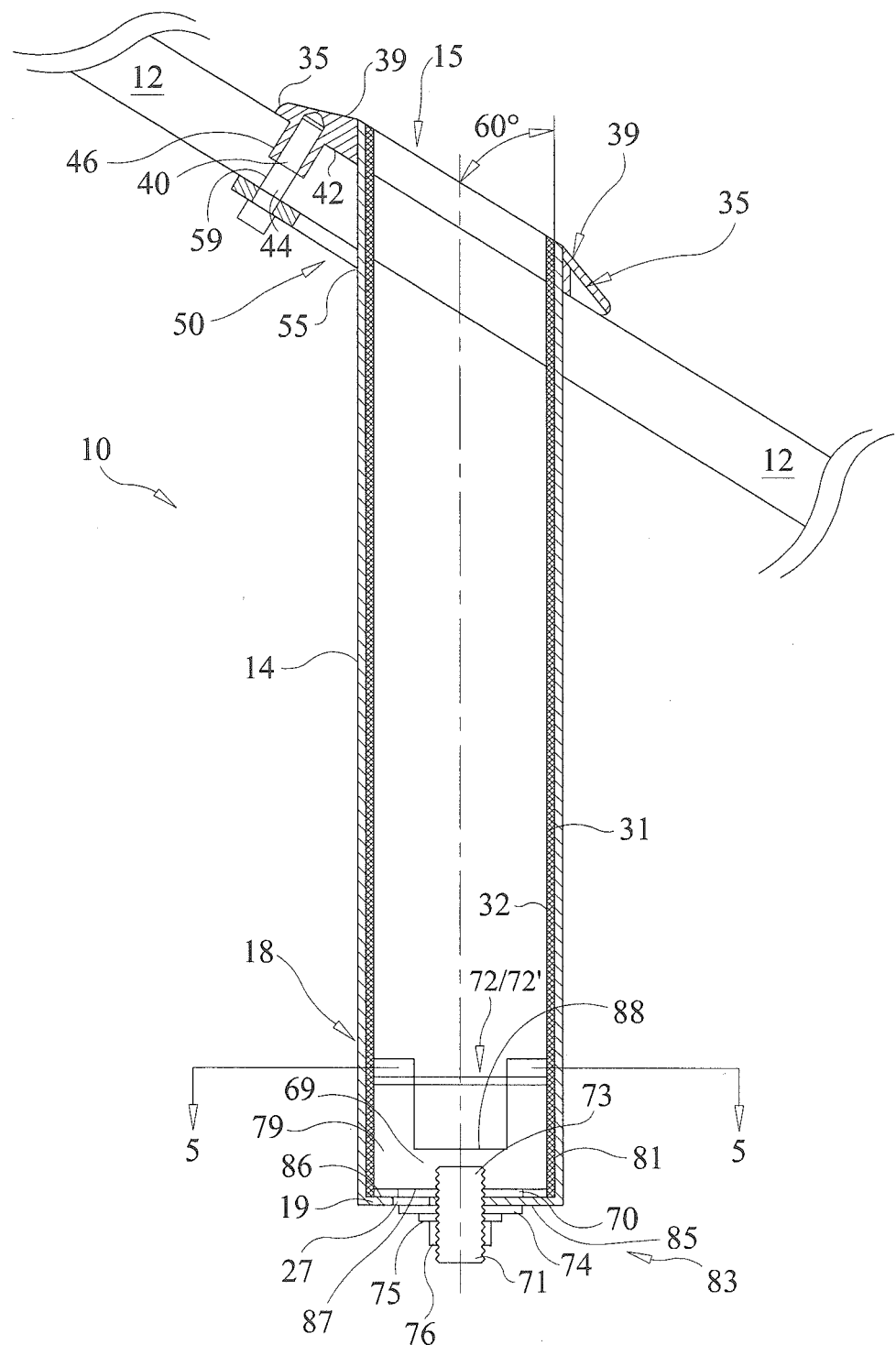
FIG. 1 is a side cross-sectional view showing a preferred embodiment of the invention, shown as installed in a panel of a marine vessel.
Figure 2:
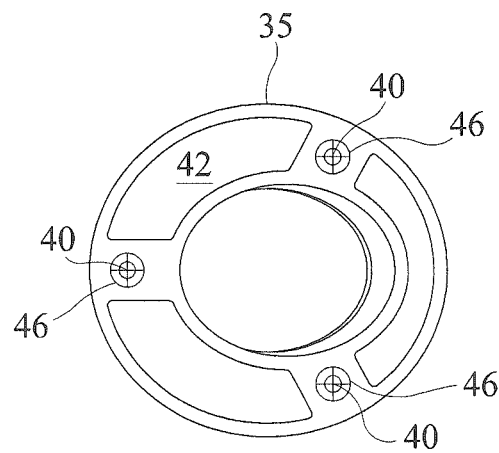
FIG. 2 is a bottom view of the mounting bezel shown in FIG. 1.

A preferred embodiment of the invention is shown in longitudinal cross-section in FIG. 1. FIG. 1 shows a fishing rod holder 10 mounted to a structural panel 12, such as a gunwhale, of a marine vessel. Fishing rod holder 10 comprises a hollow, cylindrical tube 14 having an open upper end, or mouth 15, and a lower end 18. Tube 14 may be formed of plastic or any suitable material but is preferably formed of metal of a type resistant to corrosion or plated or coated to be resistant to corrosion such as stainless steel or chrome plated steel. Optionally, lower end 18 of tube 14 may include a drain opening 27 through which water may freely drain from the interior of rod holder 10. If desired, drain opening 27 may include internal pipe threads for receiving a nipple to which a length of plastic tubing (not shown) may optionally be connected in order to direct drain water to a desired drain location. In order to protect the surface finish of fishing rods as well as to provide an attractive internal appearance, the interior of tube 14 is optionally provided with a tubular liner 31 of plastic or other suitable material sized to fit snugly but removably within the interior of tube 14 as shown in FIG. 1.

Figure 3:
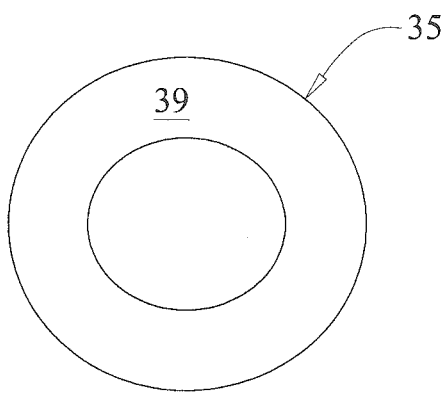
FIG. 3 is a top view of the mounting bezel shown in FIG. 2.

The open upper end 15 of hollow tube 14 is surrounded by an annular mounting bezel 35 which may suitably be formed of plastic or any desired material but which is preferably formed of aluminum, stainless steel or other corrosion resistant material. Mounting bezel 35 and hollow tube 14 are inseparable from one another and comprise a unitary member. Hollow tube 14 and said mounting bezel 13 may be inseparably connected to one another by a weld. Bezel 35 includes an upper surface 39 which may be provided with a desired surface finish and which, in accordance with the invention and as illustrated in FIGS. 1 and 3, shows no visible signs of any fasteners when rod holder 10 is installed. The surface finish of the upper surface 39 of the mounting surface is preferably one which exhibits an aesthetically pleasing appearance such as a brightly polished, or brushed metal finish or any suitable clear or colored surface coating such as an anodized finish, a powder-coated finish or the like. To this end, according to one preferred embodiment of the invention, the lower surface 42 of mounting bezel 35 is provided with at least one, and preferably several, blind holes 40 for receiving a fastener 44, such as a cap screw, used for securing fishing rod holder 10 to panel 12. If mounting bezel 35 is sufficiently thick and strong, blind holes 40 may simply be formed entirely within the main portion of the body of mounting bezel 35. Otherwise, if additional strength is needed, mounting bezel 35 can be provided with one or more hollow or partially hollow projections or bosses 46 through which pass at least a portion of the depth of blind holes 40 as shown in FIG. 1. Blind holes 40 may suitably be provided with internal threads in order to receive a correspondingly threaded fastener 44. Alternatively, fastener 44 may be of a self-tapping or self-threading type so that blind holes 40 need not be internally pre-threaded.

In the embodiment shown in FIG. 1, tube 14 happens to project from the underside 42 of mounting bezel 35 at an angle of sixty degrees (60°) but the angle is not critical to the invention. Other angles including without limitation ninety degree (90), forty-five degree (45), and thirty degree (30), or other angles are of course within the scope of the present invention.

Figure 4:
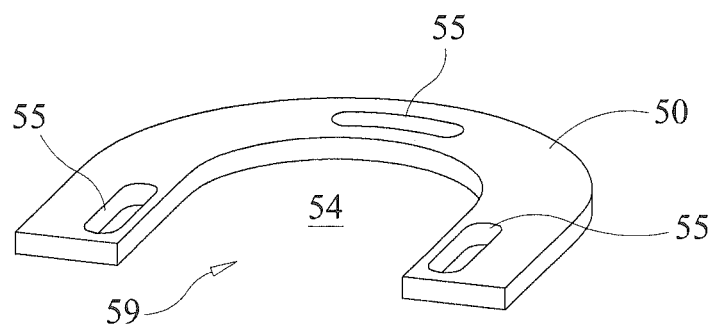
FIG. 4 is a perspective view of the optional support bracket shown in FIG. 1.

To provide enhanced structural integrity, rod holder 10 is preferably mounted with the aid of an optional backing plate 50 which may suitably be formed of a flat stock material having a central opening 54 through which tube 14 may freely pass. Backing plate 50 is particularly useful in cases where the panel 12 in which rod holder 10 is mounted is thin or lacks structural integrity. Backing plate 50 is provided with a series of openings 55 through which bodies, but not heads, of fasteners 44 may pass. Preferably, openings 55 are elongated and backing plate 50 has an open ended shape, such as the open-ended "U" shape shown in FIG. 4. The elongation of fastener openings 55 and the open end 59 of opening 54 within backing plate 50 allow an angled rod holder 10 to be installed in panels 12 having a range of thicknesses and allow a single configuration of backing plate 50 to accommodate a variety of rod holders whose tubes 14 depend at a differing angle from their mounting bezel 35.

As shown in FIG. 1, the bottom portion of tube 14 may contain a support member in the form of a disc shaped base 69, the circumferential surface of which is not flush with tube 14 both in order to account for the insertion of a tubular liner 31 and to allow the space for disc shaped base 69 to rotate about its central axis once tubular liner 31 is inserted. As FIG. 1 shows, a threaded shaft 71 engages disc shaped base 69 by way of an internally threaded blind hole 73 such that a rod engaging member 72 in the form of a pin 72', extends transversely across a portion of the diameter of the upper surface 88 of disc shaped base 69. Rod engaging member 72/72' is mechanically coupled to an adjustable brake 83. A lower surface 87 of disc shaped base 69 rests atop a first plastic washer 70 such that the lower surface 87 of disc shaped base 69 does not directly touch the bottom portion of tube 14. The top surface of a second plastic washer 74 abuts the exterior underside of tube 14 and the underside of second plastic washer 74 abuts the top surface of a stainless steel washer 75. Threaded shaft 71 passes through stainless steel washer 75, second plastic washer 74, the bottom of tube 14 and first plastic washer 70 and is securely threaded into an internally threaded blind hole 73 formed in the underside of disc shaped base 69. A hex nut of stainless steel 76 is affixed to the threaded shaft of stainless steel 71 and the top surface of hex nut of stainless steel 76 makes contact with the underside of stainless steel washer 75.

Figure 5:
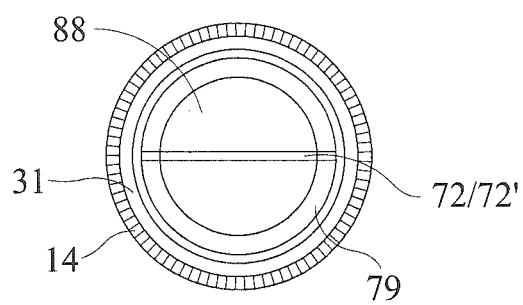
FIG. 5 is a cross-sectional top-view taken along line 5-5 of FIG. 1

As shown in FIGS. 1 and 5, the bottom portion of tube 14 contains a support member in the form of a disc shaped base 69 having an exterior wall 81 which projects upwardly in FIG. 1 to form a cup 79. As FIG. 1 shows, exterior wall 81 abuts an interior surface 32 of tubular liner 31, but preferably not such as to significantly impede the rotation of cup 79. In this embodiment, rod engaging member 72 takes the form of pin 72' whose ends are attached to the cup 79 by way of rivets (not shown). Pin 72' extends across the diameter of the cup 79. Thus, the portion of pin 72' not affixed to cup 79, a freestanding portion spanning the open inside diameter of cup 79, can engage one of the aforementioned grooves in the butt of a fishing rod. Threaded shaft 71 engages cup 79 by way of internally threaded blind hole 73 and passes through, in descending order, first plastic washer 70, the bottom surface of tube 14, second plastic washer 74, stainless steel washer 75, and, finally, a hex nut of stainless steel 76. FIG. 5 shows a top view of the swivel mechanism along line 5-5 in FIG. 1.

Rod holder 10 is installed by drilling, or otherwise forming a hole through a gunwhale, or other panel 12 of a marine vessel, of sufficient diameter to accommodate tube 14 and a mounting bezel 35. Smaller holes for accommodating fasteners 44 are then drilled, or otherwise formed, in locations corresponding to the locations of blind holes 40 of mounting bezel 35. The lower end 18 of rod holder 10 is then passed through hole 55 and rod holder 10 is lowered until the underside 42 of mounting bezel 35 rests flush on the upper surface of panel 12. Fasteners 44 are then passed upwardly through backing plate 12 and panel 12 and are fastened inside blind holes 40 to securely fasten rod holder 10 to vessel panel 12. The fasteners 44 are not visible on an upper surface 39 of mounting bezel 35 and thus neither detract from the finished appearance of the upper surface 39 of mounting bezel 35 nor accumulate contaminants or moisture capable of fostering deterioration or corrosion of surface 39.

In use, the butt end of a fishing rod may be inserted into the tube 14 of fishing rod holder 10 to support the rod for storage or while the rod is in use with the vessel either stationary or in motion, as when drifting or trolling a lure or other bait. The grooves in the butt of the rod engage rod engaging member in the form of a pin 72'. Furthermore, in each embodiment described herein, hex nut 76 may be tightened or loosened in relationship to stainless steel washer 75 on threaded shaft 71 in order to adjust the resistance of rod engaging member 72 or rod engaging member in the form of a pin 72' to pull in a given direction. The potential resistance of rod engaging member 72' to pivoting motion thus ranges from zero to substantially locked against pivoting. Threaded shaft of stainless steel 71, hex nut of stainless steel 76, stainless steel washer 75, second plastic washer 74, the bottom wall 19 of tube 14, and first stainless steel washer 70 comprise an adjustable brake 83 which is mechanically coupled to rod engaging member 72' and which may be set or adjusted by tightening or loosening hex nut 71 to set or adjust the resistance to pivoting of the rod. Brake 83 is substantially infinitely adjustable over a range which extends from substantially zero resistance to rotation to a resistance to rotation at which said rod engaging member is substantially locked against rotation.

While the invention has been described with reference to preferred embodiments, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims and all legal equivalents.

What is claimed is:

1. A fishing rod holder for mounting in an opening formed in a panel of a marine vessel to hold a fishing rod of the type having a handle terminating in a butt, said fishing rod holder, comprising:
    a hollow tube having a mouth for receiving a butt of the fishing rod;
    a mounting bezel inseparably connected to said hollow tube and at least partially surrounding said mouth, said mounting bezel having a lower surface which faces an upper surface of the panel when the rod holder is mounted to the panel, said mounting bezel having an exposed upper surface which lies above an upper surface of the panel when the rod holder is mounted to the panel, said mounting bezel having at least one blind hole formed therein which does not penetrate said upper surface of said mounting bezel;
    a substantially planar backing plate having at least one opening formed therein for receiving a fastener through said at least one opening in said backing plate and into said blind hole such that upon securing said fastener into said blind hole the panel is captured between said backing plate and said lower surface of said bezel to mount the rod holder to the panel, said backing plate not forming a part of said hollow tube;
    a rotatable rod engaging member disposed within said hollow tube for detachably engaging the butt of the fishing rod to detachably rotationally couple the fishing rod to said rod engaging member, and
    a brake coupled to said rod engaging member, said brake being adjustable for adjusting resistance of said rod engaging member to rotation said brake extending through a bottom end of said hollow tube.

2. A fishing rod holder as claimed in claim 1, wherein said brake is adjustable over a range of resistance to said rotation of said rod engaging member.

3. A fishing rod holder as claimed in claim 2, wherein said range is a range which includes substantially zero resistance to said rotation of said rod engaging member.

4. A fishing rod holder as claimed in claim 3, wherein said brake is substantially infinitely adjustable over a range which extends from substantially zero resistance to rotation to a resistance to rotation at which said rod engaging member is substantially locked against rotation.

5. A fishing rod holder as claimed in claim 1, wherein said hollow tube and said mounting bezel are inseparably connected to one another by a weld.

6. A fishing rod holder as claimed in claim 1, wherein said hollow tube and said mounting bezel comprise a unitary member.

7. A fishing rod holder as claimed in claim 1 wherein said adjustable brake comprises:
    a shaft attached to a support member disposed in a lower portion of said tube, said support member supporting a rod engaging member adapted to engage a groove on a butt of the fishing rod;
    a first washer mounted on said shaft and captured between said support member and an upper side of a bottom wall of said tube;
    a second washer mounted on said shaft and captured between a lower side of said bottom wall of said tube, and
    a nut threaded onto said shaft.

8. A fishing rod holder as claimed in claim 7 wherein said support member comprises a disc.

9. A fishing rod holder as claimed in claim 8 wherein said first washer is captured between a lower surface of said disc and said upper side of said bottom wall of said tube.

10. A fishing rod holder as claimed in claim 7 further comprising, a wall which projects from said disc, said wall and said disc forming a cup having a hollow interior and wherein said rod engaging member comprises a pin which extends across said hollow interior.

11. A fishing rod holder for mounting in an opening formed in a panel of a marine vessel to hold a fishing rod of the type having a handle terminating in a butt, said fishing rod holder, comprising:
    a hollow tube having a mouth for receiving a butt of the fishing rod;
    a mounting bezel inseparably connected to said hollow tube and at least partially surrounding said mouth, said mounting bezel having a lower surface which faces an upper surface of the panel when the rod holder is mounted to the panel, said mounting bezel having an exposed upper surface which lies above an upper surface of the panel when the rod holder is mounted to the panel, said mounting bezel having at least one blind hole formed therein which does not penetrate said upper surface of said mounting bezel;
    a substantially planar backing plate having at least one opening formed therein for receiving a fastener through said at least one opening in said backing plate and into said blind hole such that upon securing said fastener into said blind hole the panel is captured between said backing plate and said lower surface of said bezel to mount the rod holder to the panel, said backing plate not forming a part of said hollow tube;
    a rotatable rod engaging member disposed within said hollow tube for detachably engaging the butt of the fishing rod to detachably rotationally couple the fishing rod to said rod engaging member, and a brake coupled to said rod engaging member, said brake being adjustable for adjusting resistance of said rod engaging member to rotation, said brake being substantially infinitely adjustable over a range which extends from substantially zero resistance to rotation to a resistance to rotation at which said rod engaging member is substantially locked against rotation.

12. A fishing rod holder as claimed in claim 11 wherein said adjustable brake comprises:

a shaft attached to a support member disposed in a lower portion of said tube, said support member supporting a rod engaging member adapted to engage a groove on a butt of the fishing rod;

a first washer mounted on said shaft and captured between said support member and an upper side of a bottom wall of said tube;

a second washer mounted on said shaft and captured between a lower side of said bottom wall of said tube, and a nut threaded onto said shaft.

13. A fishing rod holder as claimed in claim 12 wherein said support member comprises a disc.

14. A fishing rod holder as claimed in claim 13 wherein said first washer is captured between a lower surface of said disc and said upper side of said bottom wall of said tube.

15. A fishing rod holder as claimed in claim 12 further comprising, a wall which projects from said disc, said wall and said disc forming a cup having a hollow interior and wherein said rod engaging member comprises a pin which extends across said hollow interior.

\* \* \* \* \*